United States Patent
Tabuchi et al.

(10) Patent No.: US 7,028,140 B2
(45) Date of Patent: Apr. 11, 2006

(54) STORAGE SYSTEM AND METHOD FOR ACQUISITION AND UTILIZATION OF SNAPSHOTS

(75) Inventors: Hideo Tabuchi, Odawara (JP); Akinobu Shimada, Chigasaki (JP); Masataka Innan, Odawara (JP)

(73) Assignee: Hitachi, Ltd., Tokyo (JP)

( * ) Notice: Subject to any disclaimer, the term of this patent is extended or adjusted under 35 U.S.C. 154(b) by 59 days.

(21) Appl. No.: 10/902,031

(22) Filed: Jul. 30, 2004

(65) Prior Publication Data

US 2005/0273557 A1     Dec. 8, 2005

(30) Foreign Application Priority Data

Jun. 7, 2004     (JP)     ............... 2004-168262

(51) Int. Cl.
*G06F 12/02*     (2006.01)
(52) U.S. Cl. .................. 711/114; 711/100; 711/161; 711/162; 711/165; 711/202; 711/203; 714/6; 714/15; 714/20
(58) Field of Classification Search ................. 711/114, 711/161–162, 165, 203
See application file for complete search history.

(56) References Cited

U.S. PATENT DOCUMENTS

| | | | |
|---|---|---|---|
| 6,081,875 A | 6/2000 | Clifton et al. | |
| 6,640,291 B1 | 10/2003 | Fujibayashi et al. | |
| 6,658,541 B1 | 12/2003 | Kitamura et al. | |
| 6,694,413 B1 * | 2/2004 | Mimatsu et al. ............ | 711/162 |
| 6,701,411 B1 | 3/2004 | Matsunami et al. | |
| 2002/0129214 A1 | 9/2002 | Sarkar | |
| 2003/0131207 A1 | 7/2003 | Arakawa | |
| 2003/0229651 A1 * | 12/2003 | Mizuno et al. ............. | 707/200 |
| 2004/0111485 A1 | 6/2004 | Mimatsu et al. | |
| 2005/0125618 A1 | 6/2005 | Arakawa et al. | |

FOREIGN PATENT DOCUMENTS

| | | |
|---|---|---|
| EP | 1 349 089 | 10/2003 |
| EP | 1 424 632 | 6/2004 |
| JP | 2002-278819 | 9/2002 |

OTHER PUBLICATIONS

Jooss, et al. "Oracle9i for UNIX: Backup and Recovery Using a NetApp Filer in a SAN Environment", Apr. 2004, pp. 1-23.

* cited by examiner

*Primary Examiner*—Matthew Kim
*Assistant Examiner*—Zhuo H. Li
(74) *Attorney, Agent, or Firm*—Antonelli, Terry, Stout and Kraus, LLP.

(57) ABSTRACT

There are provided a mainframe 1 constituting a host device and a disk array system 2 having logical volumes (LDEV) 30 connected with the mainframe 1. The mainframe 1 is provided with an input/output device configuration definition information storage section 14 that stores the address of an LDEV 30a. By referring to the input/output device configuration definition information storage section 14, a command is then issued giving an instruction to perform back-up of the LDEV 30a specifying the address of the LDEV 30a. The disk array system 2 receives the back-up command, specifies the generation to which the LDEV 30a is to be backed up and backs up to an LDEV 30b to 30d corresponding to the specified generation.

10 Claims, 9 Drawing Sheets

| PATH ID | CONTROL DEVICE NUMBER | LOGICAL VOLUME ADDRESS |
|---|---|---|
| PATHID#00 | CU#0 | DEVA#00 |
| PATHID#01 | CU#0 | DEVA#01 |

141 142 143

>YKMAKE DEVA#00 DEVA#01 1

- SNAPSHOT ACQUISITION INSTRUCTION
- 210 ADDRESS OF MAIN VOLUME
- 220 ADDRESS OF AUXILIARY VOLUME
- 230 GENERATION NUMBER
- 200

FIG. 4

| 251 | 252 | 253 | 254 | 255 | 256 |
|---|---|---|---|---|---|
| MAIN VOLUME ADDRESS | AUXILIARY VOLUME ADDRESS | GENERATION NUMBER | ADDRESS OF LDEV FOR EACH GENERATION | UTILIZATION FLAG | SNAPSHOT ACQUISITION TIME POINT |
| DEVA#00 | DEVA#01 | 1 | DEVA#01 | OFF | 2005/1/20 10:33:40 |
| | | 2 | DEVA#02 | OFF | 2005/1/20 20:12:33 |
| | | 3 | DEVA#03 | ON | 2005/1/13 15:26:14 |
| | | ... | ... | ... | ... |
| | | N | DEVA#N | OFF | 2005/1/19 22:25:55 |
| ... | ... | | | ... | ... |

STORAGE SYSTEM AND METHOD FOR ACQUISITION AND UTILIZATION OF SNAPSHOTS

CROSS-REFERENCE TO PRIOR APPLICATION

This application relates to and claims priority from Japanese Patent Application No.2004-168262, filed on Jun. 7, 2004, the entire disclosure of which is incorporated herein by reference.

BACKGROUND OF THE INVENTION

In a system wherein a mainframe accesses input/output devices in accordance with configuration definitions of the input/output devices that are registered beforehand, the present invention relates to a technique for taking a plurality of generations of snapshots in a flexible manner without altering the configuration definitions of the input/output devices.

In general, when a mainframe performs input/output of data in respect of input/output devices such as disk volumes or tape volumes, it performs this input/output of data in accordance with the configuration of the input/output device that is registered in the operating system (OS). The system administrator must therefore perform beforehand the task referred to as configuration definition of the input/output devices. Typically, configuration definition of the input/output devices involves definition of the bus whereby the device performs input/output, definition of the number of the control device of the input/output device and definition of the storage device address. This makes it possible for these input/output devices to be used from the mainframe by putting these input/output devices into a condition in which they are logically incorporated with the mainframe to constitute the system.

Also, an upper limit on the number of input/output devices i.e. the number of device addresses that can be defined is laid down, depending on the type of mainframe and OS. Mainframes therefore cannot use a number of input/output devices that exceeds this upper limiting value.

Also, the amount of data that needs to be saved continues to increase with increase in the amounts of data that are accumulated. In many cases, the practice is adopted that data that are constantly accessed by a client business are saved on a disk array system and after the business that makes use of these data has finished with them, a back-up of the data is saved on a tape system. With this practice, if there should be any corruption of the data stored on the disk array system due for example to a mistake in operation, the data can be restored to the original condition by using the back-up acquired by the tape system. However, the time required for acquiring this back-up is proportional to the amount of data.

Furthermore, in recent years, with increases in the amount of data and increased penetration of 24 hour continuous service, cases have started to arise in which sufficient back-up time to back-up the data of the disk array system to a tape system cannot be secured. Cases in which use is made of so-called "snapshots" as a technique for maintaining a back-up of the data in question at a given time-point in a disk array system have therefore become more frequent. A "snapshot" as referred to here indicates a logical copy for restoring the data condition at a given time-point. If the practice is adopted of taking snapshots at as high a frequency as possible i.e. with time intervals that are short as possible, if it should subsequently be necessary to restore the data, the restoration time can be shortened by employing a snapshot that is closer to the time-point to which restoration is desired.

SUMMARY OF THE INVENTION

However, in the case of a mainframe, even though a snapshot is acquired, unless the snapshot volume in question is defined from the mainframe as an input/output device, the snapshot in question cannot be used. It is therefore necessary to define the snapshot volume beforehand from the mainframe. For example, if one week's worth of snapshots, taken every two hours, of a single volume of data are held, it is necessary that for example 84 snapshot volume addresses should be registered as configuration definitions.

In general, alteration of the configuration definitions is not performed frequently, being only carried out in restricted circumstances such as when volumes are added or subtracted by adding or subtracting equipment; it is desirable that the number of times that alteration of the configuration definitions of the system is carried out is small, since this is something that requires the time of the system administrator.

SUMMARY OF THE INVENTION

Accordingly, an object of the present invention is to provide a technique for managing a plurality of generations of snapshots of input/output devices on a mainframe in a flexible manner without altering the configuration definitions of the input/output devices.

A storage system according to an embodiment of the present invention consists in a storage system that is accessed from a host device, comprising: a storage device comprising a plurality of logical volumes; a storage device control section that controls said storage device; an interface section that receives a snapshot acquisition instruction and snapshot utilization instruction from said host device; and a snapshot processing device that executes processing for acquisition and utilization of snapshots in accordance with said snapshot acquisition instruction and said snapshot utilization instruction received by said interface section. The snapshot processing device, in response to a snapshot acquisition instruction, selects a logical volume that is capable of use as a snapshot target from the plurality of logical volumes; instructs the storage device control section to acquire a snapshot of the logical volume of the snapshot source, designated in the snapshot acquisition instruction for the selected logical volume, and holds generation information that associates the generation number specified in the snapshot acquisition instruction with the address of the selected logical volume. In addition, in response to a snapshot utilization instruction, the snapshot processing device specifies a logical volume where the snapshot corresponding to the generation number specified in the snapshot utilization instruction is held, by referring to the generation information, and allocates an address accessible by the host device to the specified logical volume.

In a preferred embodiment, the address accessible by the host device that is allocated to the specified logical volume is a logical volume address that is registered beforehand in the host device.

In a preferred embodiment, when the address accessible by the host device is allocated to the specified logical volume, the snapshot processing device adds information indicating the fact that the address accessible by the host device has been allocated to the specified logical volume to the generation information.

In a preferred embodiment, the snapshot acquisition instruction may further include designation of the logical volume of the snapshot target. The snapshot processing device may then, in response to the snapshot acquisition instruction, if the snapshot target logical volume designated in the snapshot acquisition instruction is already used, select an unused logical volume from the plurality of logical volumes and give an instruction to the storage device control section to acquire a snapshot of the snapshot source logical volume designated in the snapshot acquisition instruction for the selected logical volume.

In a preferred embodiment, the snapshot utilization instruction may further include designation of the logical volume of the snapshot target. The snapshot processing device may then, in response to the snapshot utilization instruction, by referring to the generation information, if a snapshot of the generation number specified in the snapshot utilization instruction has not been acquired by the snapshot target logical volume specified in the snapshot utilization instruction, allocate the logical volume address of the specified snapshot target to the logical volume where the snapshot of the designated generation number is held. In addition, it may be arranged to give notification to the host device of the fact that a snapshot of the specified generation number has become available for use.

A storage system according to an embodiment of the present invention consists in a storage system that is accessed from a host device, comprising: a storage device comprising a plurality of logical volumes; a storage device control section that controls said storage device; an interface section that receives a snapshot acquisition instruction from said host device, a snapshot utilization instruction and a generation information acquisition instruction; and a snapshot processing device comprising a generation information storage section that stores generation information indicating the snapshot acquisition status for each generation and that executes processing in accordance with said snapshot acquisition instruction, said snapshot utilization instruction and generation information acquisition instruction received by said interface section. The snapshot processing device, in response to the snapshot acquisition instruction, selects one logical volume from the plurality of logical volumes; it then gives an instruction to acquire a snapshot of the logical volume of the snapshot source designated in the snapshot acquisition instruction for the selected logical volume. In addition, the snapshot processing device, by referring to the generation information storage section, specifies a generation number and associates this specified generation number with the address of the selected logical volume and stores these in the generation information storage section. The snapshot processing device also acquires the information stored in the generation information storage section in response to the generation information acquisition instruction and gives an instruction to the interface section to send the information to the host device. The snapshot processing device also, in response to the snapshot utilization instruction, by referring to the generation information storage section, specifies the logical volume where a snapshot has been acquired corresponding to the generation number specified in the snapshot utilization instruction. An address accessible by the host device is then allocated to this specified logical volume.

BRIEF DESCRIPTION OF THE DRAWINGS

FIG. 4 is a view showing an example of generation management information;

DETAILED DESCRIPTION OF THE INVENTION

A computer system according to a first embodiment of the present invention is described below with reference to the drawings.

Figure 1:
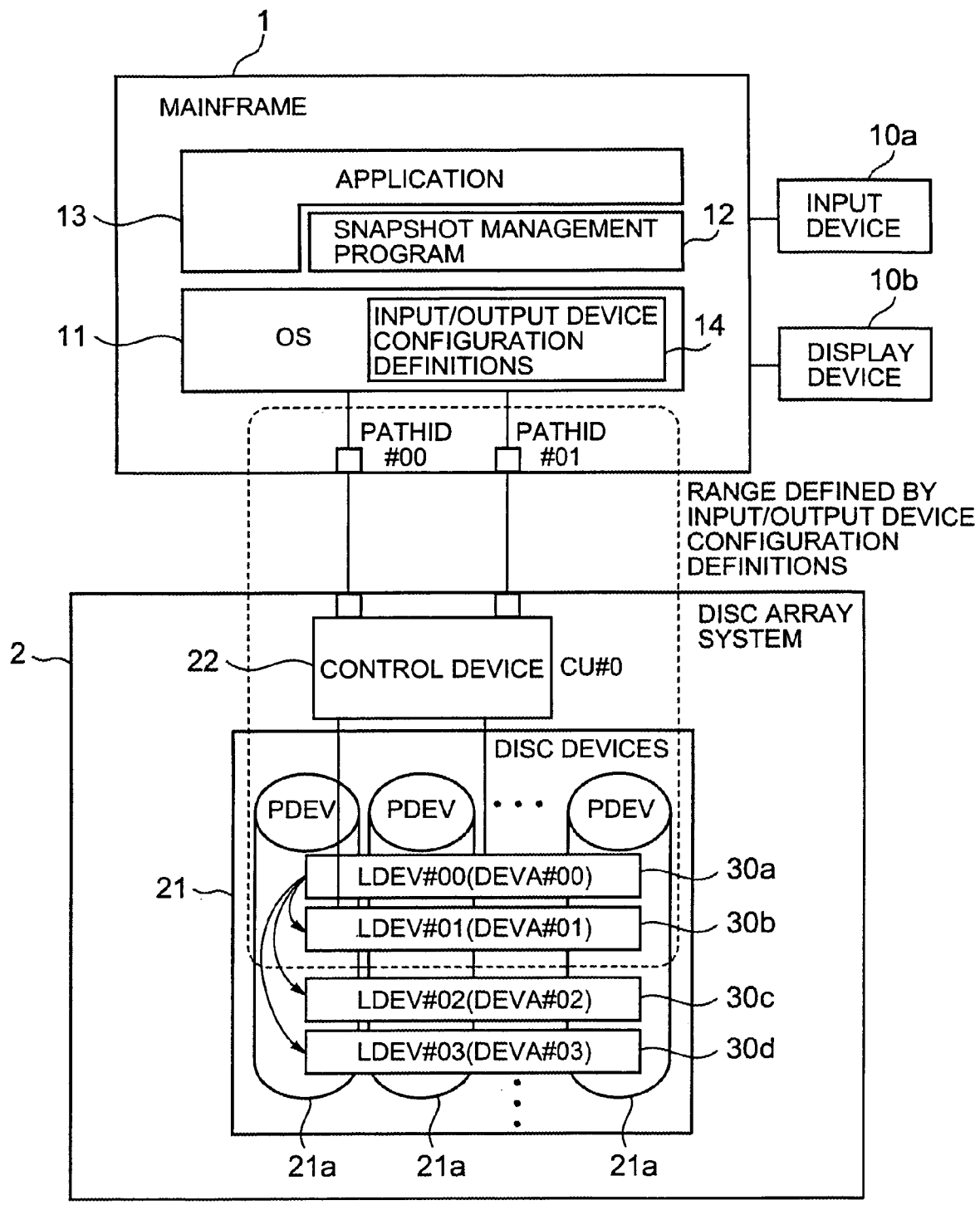
FIG. 1 is a diagram of a computer system according to an embodiment of the present invention.

First of all, FIG. 1 is a view illustrating diagrammatically the entire layout of this system. This system comprises a mainframe 1 constituting a host device and a disk array system constituting an external storage device of the mainframe 1.

The disk array system 2 comprises a disk device 21 comprising a plurality of physical volumes (hereinbelow called PDEV) 21a and a control device 22 that performs control of the disk device 21. In the disk device 21, a plurality of logical volumes (hereinbelow called LDEVs) 30 (30a to 30d) are constituted spanning the plurality of PDEVs 21a. The control device 22 manages the disk device 21 for each LDEV 30, respective logical addresses being allocated to the LDEVs 30.

An operating system (OS) 11, a snapshot management program 12, and a prescribed application program 13 are installed on the mainframe 1. The snapshot management program 12 performs processing such as taking a snapshot of a prescribed LDEV of the disk array system 2 periodically or with any desired timing and generating a command for making a snapshot utilizable.

Figures 2, 6:
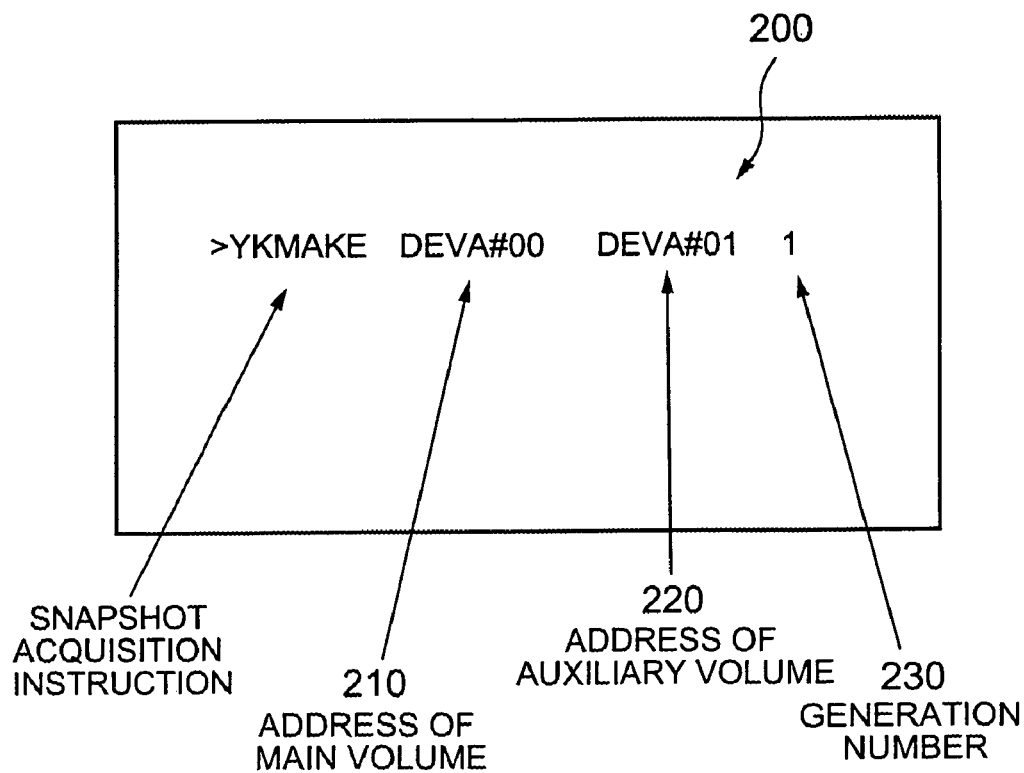
FIG. 2 is a view showing an example of input/output device configuration definition information.
FIG. 6 is a view showing an example of when a snapshot command is input from the command line.

Also, input/output device configuration definition information (hereinbelow sometimes simply referred to as configuration definition information) 14 is registered beforehand in the OS 11. FIG. 2 shows an example of the input/output device configuration definition information 14. Specifically, the configuration definition information 14 comprises as data items a bus ID 141 of the bus that is set as the access path in respect of the disk array system 2, the number 142 of the control device 22 in the disk array system 2 that is accessed by each bus, and the address 143 of an LDEV 30 that is accessible by each bus.

The mainframe 1 can access the disk array system 2 by designating the address of the LDEV that is to be accessed, by referring to the input/output device configuration definition information 14. The mainframe 1 can therefore only access an LDEV that is previously defined in the input/output device configuration definition information 14. In the example of FIG. 2, the structure in the range enclosed by the broken line of FIG. 1 is defined. In this case, the mainframe can therefore only access the LDEVs 30a and 30b and cannot directly access the other LDEVs 30c, 30d, . . . .

Figure 3:
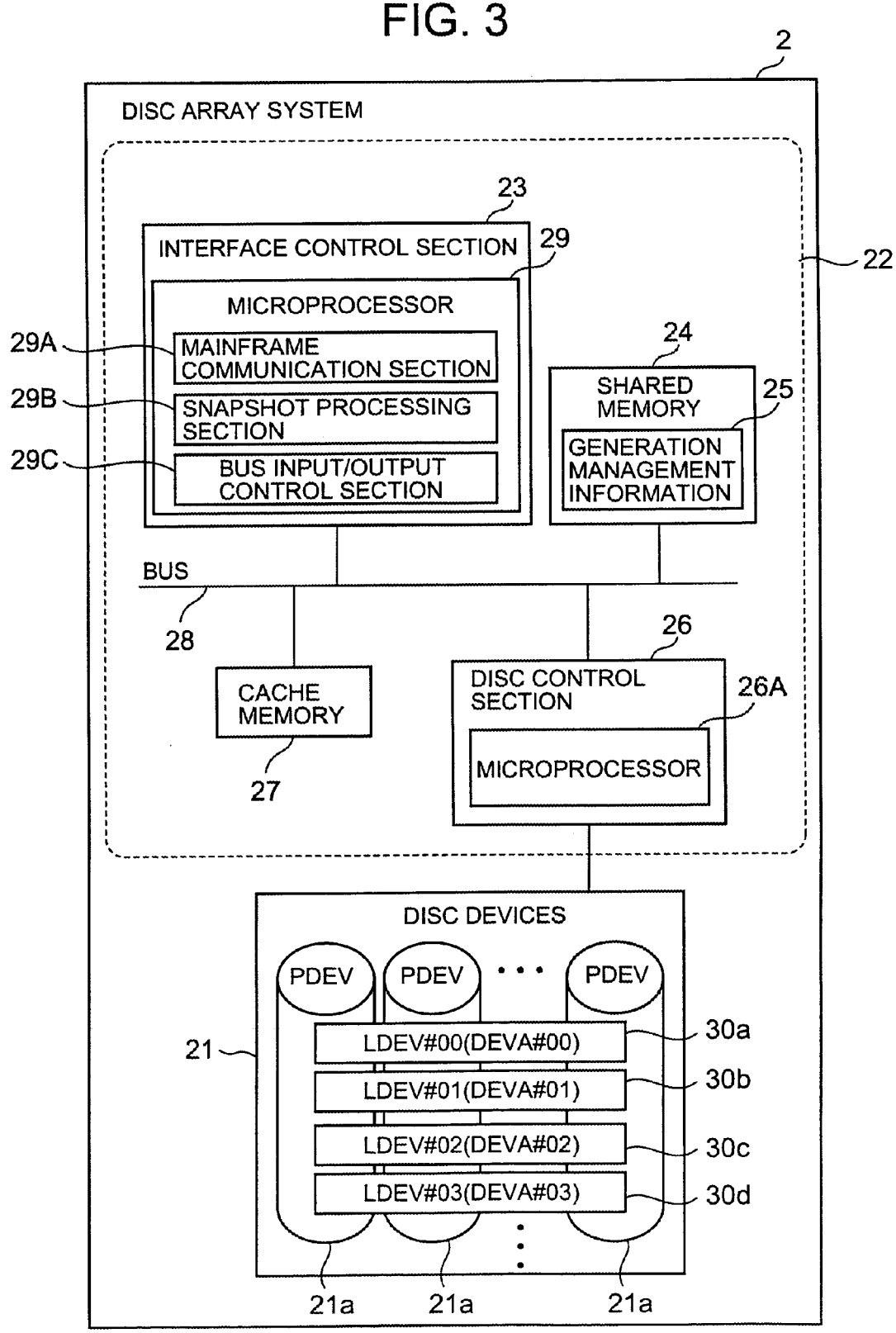
FIG. 3 is a functional layout diagram of a disk array system.

Next, the functional layout of the disk array system 2 will be described in detail with reference to the block diagram shown in FIG. 3. As shown in this Figure, the control device 22 of the disk array system 2 comprises an interface control section 23, shared memory 24, disk control section 26 and a cache memory 27 that are mutually connected by means of a bus 28. The interface control section 23 comprises a programmed microprocessor 29; a mainframe communication section 29A that performs input/output of information with respect to the mainframe, a snapshot processing section 29B and a bus input/output control section 29C that controls data input/output with respect to the bus 28 are implemented by controlling the microprocessor 29. The disk control section 26 comprises a programmed microprocessor 26A and performs control of the disk device 21. The shared memory 24 is constituted by for example non-volatile memory and stores generation management information 25. The shared memory 24 and the cache memory 27 may be constituted by respectively different memories or may be constituted on the same memory. The bus 28 may be constituted by a high-speed bus such as a very high-speed cross bus, in which data transfer is performed by a high-speed switching action.

When for example the disk array system 2 issues a command for the mainframe 1 to execute data input/output in respect of the LDEV 30a (DEVA #00), this is received by the mainframe communication section 29A. If for example the received command is an instruction to input (write) data in respect of the LDEV 30a, the bus input/output control section 29C stores the data to be written in the cache memory 27 and the disk control section 26 writes the data in the LDEV 30a asynchronously. On the other hand, if the received command is an instruction to output (read) data in respect of the LDEV 30a, the disk control section 26, in accordance with an instruction from the bus input/output control section 29C, reads the designated data from the LDEV 30a and stores it in the cache memory 27 and the bus input/output control section 29C acquires this data from the cache memory 27 and outputs it to the mainframe 1.

Also, the disk array system 2 according to this embodiment performs generation management of a plurality of snapshots. For example, when the mainframe communication section 29A receives a snapshot acquisition command and a utilization command from the mainframe 1, the snapshot processing section 29B executes various types of processing necessary for acquisition and utilization of a snapshot, as will be described.

In fact, when a snapshot is acquired, the disk control section 26 acquires a snapshot when the snapshot processing section 29B gives an instruction for performance of back-up (i.e. snapshot acquisition), designating the address of the main volume (snapshot source volume) that is the subject of back-up and the address of an auxiliary volume (snapshot target volume) that is the back-up target.

The generation management information 25 indicates the acquisition status of each generation of snapshots of the LDEV that is the subject of back-up. FIG. 4 shows an example of the information that is stored in the generation management information 25. Specifically, the data items of the generation management information 25 comprise the address 251 of the main volume, the address 252 of the auxiliary volume, the generation number 253 that identifies the generation, the LDEV addresses 254 for each generation allocated for a snapshot of the various generations, the utilization flag 255 and the snapshot acquisition time point 256.

The address 251 of the main volume is the address of the LDEV that is the subject of back-up. In this case, the main volume 251 is the LDEV 30a, so its address DEVA #00 is stored.

The address 252 of the auxiliary volume indicates the address of the LDEV that is recognized an auxiliary volume by the mainframe 1. That is, although, in this embodiment, a plurality of generations of snapshots can be managed, as will be described, the only back-up target auxiliary volume that can be recognized by the mainframe 1 is the LDEV 30b. In this case, DEVA #01 is therefore stored in the address 252 of the auxiliary volume.

The generation number 253 is the generation number that is assigned to each snapshot.

The LDEV addresses 254 for each generation are the addresses of LDEV 30 that are allocated to each respective generations. The LDEV addresses 254 for each generation are allocated beforehand to each generation; they may be registered in the generation management information 25 or the necessary generation address may be allocated when the snapshot is acquired.

The utilization flag 255 is a flag for identifying generations that are capable of being utilized from the mainframe 1. The condition of being utilizable from the mainframe 1 i.e. that the address 252 of the auxiliary volume is temporarily allocated is a condition in which data input/output from the mainframe 1 is feasible. In the example of FIG. 4, for example the snapshot of generation number 3 is utilizable.

Figure 5:
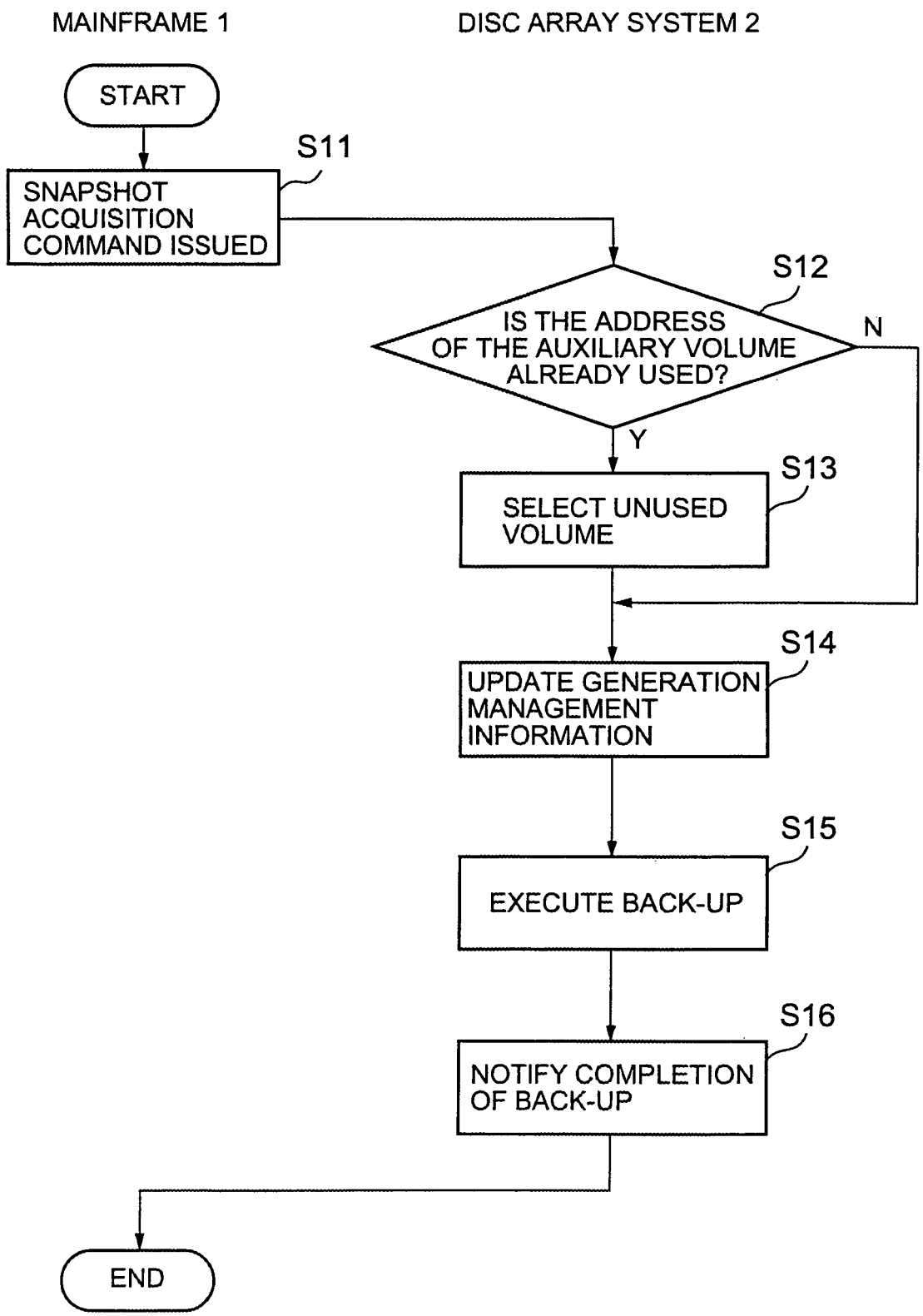
FIG. 5 is a flow chart showing the sequence of snapshot acquisition processing.

In a system comprising a construction as described above, the processing for acquiring snapshots of the LDEV 30a for each generation will be described with reference to the flow chart of FIG. 5.

First of all, in the main frame 1, in response to an instruction from an application 13 or an instruction from the user using an input device 10a, the snapshot management program 12 issues (S11) a snapshot acquisition command in respect of the disk array system 2. The snapshot acquisition command may include for example an address and generation number for specifying the main volume and auxiliary volume. For example, FIG. 6 shows an example of the case where a snapshot acquisition command is input by the user on the command line 200. In this case, on the command line 200, following the snapshot acquisition command, the main volume address 210, the auxiliary volume address 220 and the generation number 230 are input. Thus the information that is input on the command line 200 is included in the snapshot acquisition command.

The control device 22 of the disk array system 2 receives this snapshot acquisition command. The snapshot processing section 29B then, by referring to the generation management information 25, determines whether the address of the auxiliary volume that is contained in the snapshot acquisition command is registered in the LDEV addresses 254 for each generation i.e. determines whether or not this address is already used (S12). If the address is already used (S12: Yes), the snapshot processing section selects one of the unused LDEVs (S13).

If the address is unused (S12: No), and if an unused LDEV is selected in the step S13, the address of this LDEV is stored in the LDEV addresses 254 for each generation, associated with the generation number contained in the snapshot acquisition command, and the generation management information is updated (S14). The snapshot processing section 29B then gives an instruction for execution of back-up to the disk control section 26, by designating the addresses of the main volume and auxiliary volume. The disk control section 26 thereby acquires a snapshot f (S15). When a snapshot has been acquired, the snapshot processing section 29B notifies the mainframe 1 of completion of acquisition of a snapshot (S16).

It is thereby possible to acquire a snapshot to a volume that the mainframe 1 does not directly recognize. As a result, anumber of snapshots equal to or greater than the number of volumes registered in the configuration definition information of the mainframe 1 can be acquired for each generation.

Figure 7:
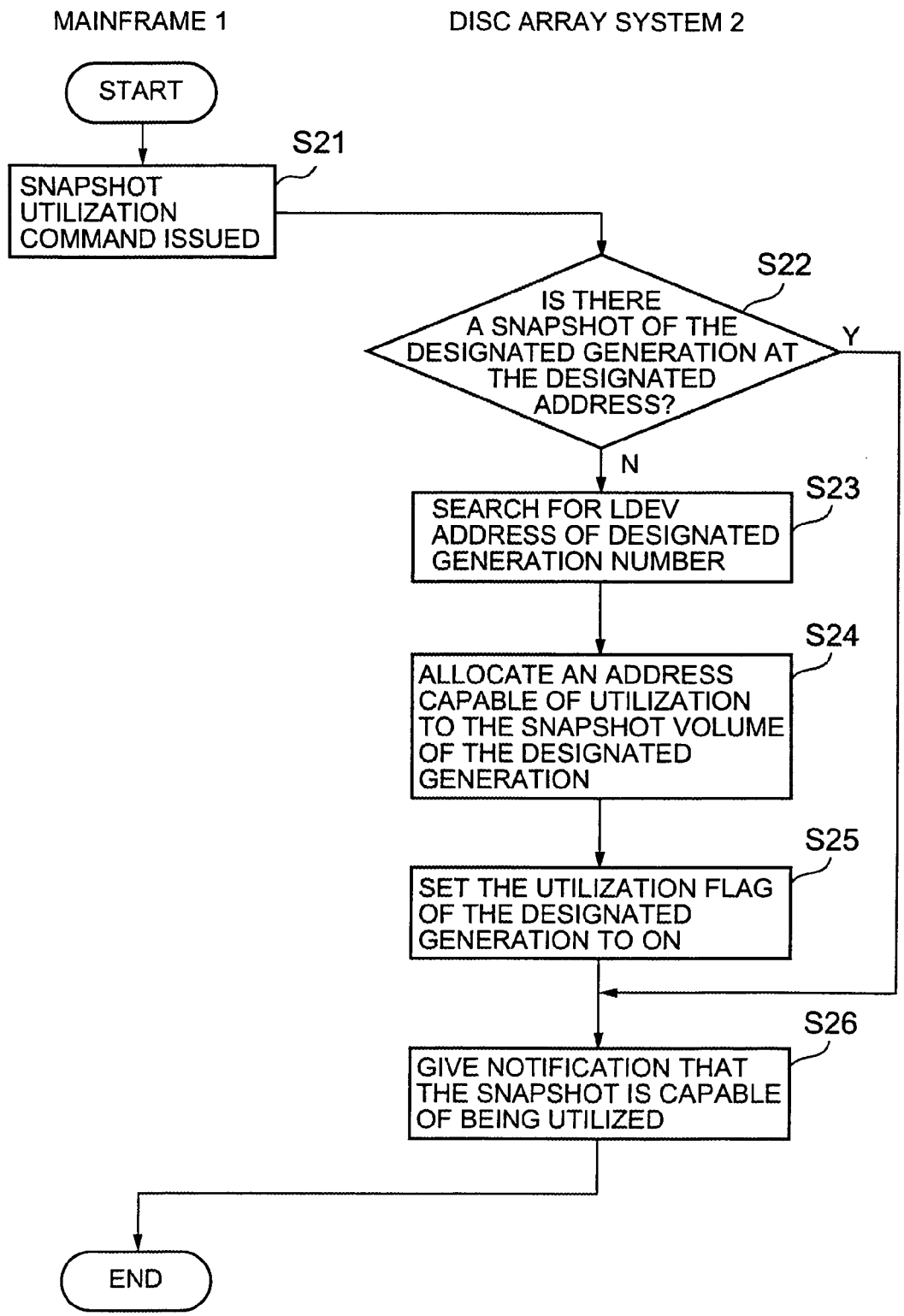
FIG. 7 is a flow chart showing the processing sequence for making a snapshot utilizable.

Next, processing for utilization of one of the snapshots acquired by the above processing will be described with reference to the flow chart of FIG. 7.

First of all, the snapshot management program 12 issues (S21) a snapshot utilization command in accordance with information that is input by the user from an input device 10a or in accordance with information received as an instruction from an application 13. The snapshot utilization command includes for example the address of the LDEV (in this case, DEVA #00) that is the subject of back-up, the snapshot address (in this case, DEVA #01) and the snapshot generation number that is desired to be utilized. This snapshot utilization command is a command to make it possible for the mainframe 1 to utilize the snapshot of the designated generation of the LDEV 30a that is the subject of back-up as DEVA #01.

The control device 22 of the disk array system 2 receives this snapshot utilization command. The snapshot processing section 29B then determines (S22) whether the designated generation number is associated with the snapshot address designated in the snapshot utilization command, by referring to the generation number 253 of the generation management information 25 and the LDEV addresses 254 for each generation.

If the designated generation number is not associated with the designated snapshot address (S22: No), the mainframe 1 cannot directly access the snapshot volume of the designated generation. For example, if "3" is designated as the generation number by the snapshot utilization command, the address of the generation number "3" found in the LDEV addresses 254 for each generation is "DEVA #03", so the main frame 1 cannot access the snapshot volume of generation number "3". The snapshot processing section 29B therefore specifies (S23) an item in the LDEV addresses 254 for each generation (in the above example, DEVA #03) corresponding to the designated generation number, by referring to the generation management information 25.

The address (DEVA #01) designated by the snapshot utilization command is then allocated (S24) to the snapshot volume of this specified address. That is, in the above example, DEVA #03 is converted to DEVA #01.

The snapshot processing section 29B then notifies (S26) the mainframe 1 that the snapshot volume of the designated generation has become utilizable by setting the utilization flag 255 of the generation number (3 in the above example) specified by the generation management information 25 to ON (S25).

In this way, the mainframe 1 can access the snapshot volume of the designated generation as the already-defined DEVA #01 in the configuration definition 14. As a result, it becomes possible to utilize snapshot volumes from a large number of snapshot volumes of volume number greater than that defined in the configuration definition 14 by specifying their generation number.

Next, a second embodiment of the present invention will be described. In this embodiment, the system layout shown in FIG. 1 to FIG. 4 is the same as that of the first embodiment. However, in this embodiment, the processing sequence for acquisition and utilization of a snapshot is different from that of the first embodiment. This processing sequence is described below with reference to FIG. 8 to FIG. 10.

Figure 8:
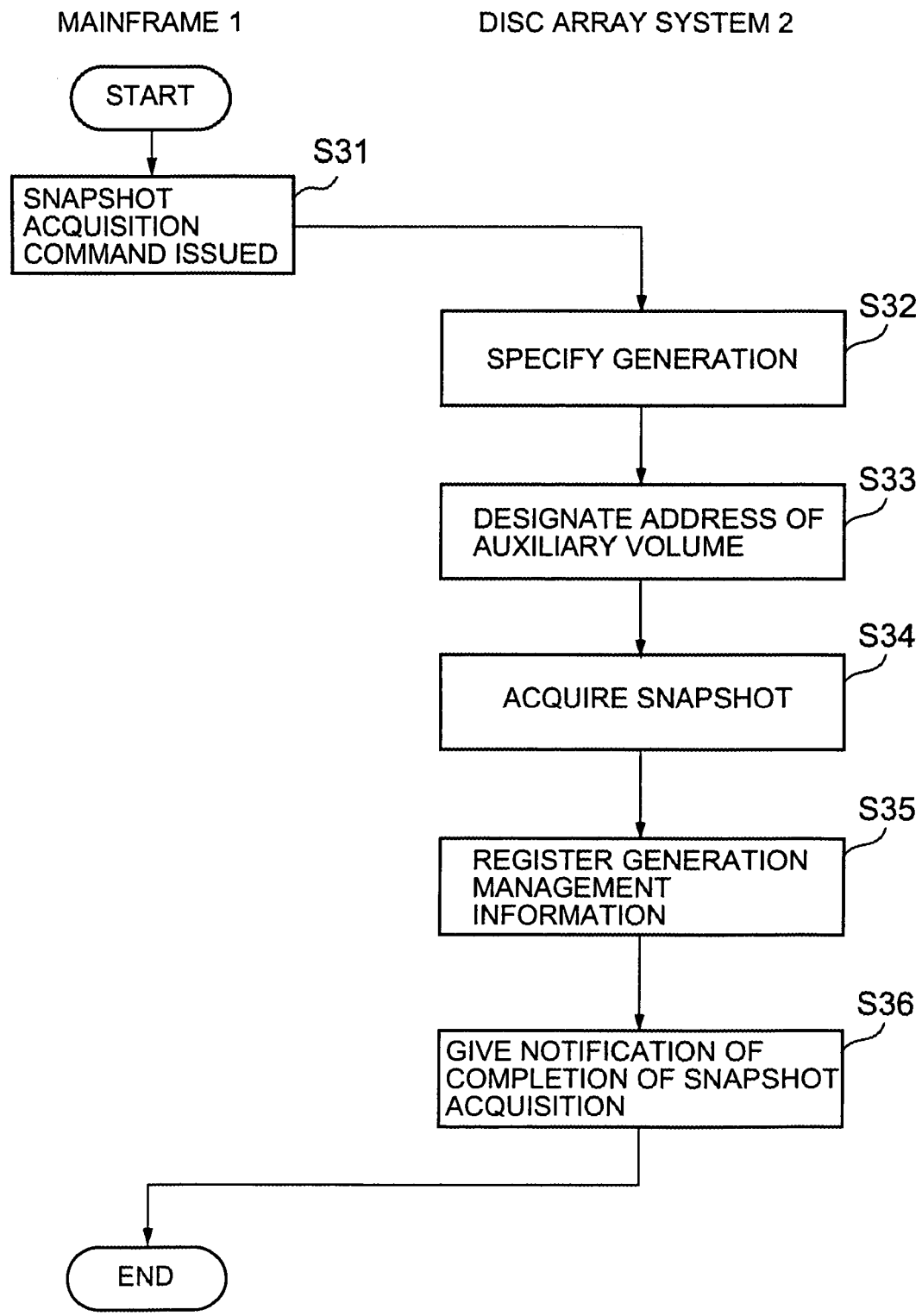
FIG. 8 is a flow chart showing the sequence of snapshot acquisition processing.

FIG. 8 is a flow chart showing the snapshot acquisition processing sequence according to this embodiment. First of all, the snapshot management program 12 of the main frame 1 issues (S31) a snapshot acquisition command in respect of the disk array system 2, in response to an instruction from the application 13 or an instruction from the user using the input device 10a, in the same way as in the first embodiment. This snapshot acquisition command includes at least the address of the main volume and may further include the address of the auxiliary volume.

When the control device 22 receives this back-up command, the snapshot processing section 29B, by referring to the generation management information 25, specifies (S22) the generation number of the generation at which a back-up is to be taken. For example, in this embodiment, the LDEV addresses 254 for each generation are allocated beforehand to each generation number 253. Then, if there is a generation which is unused i.e. whose back-up time-point 256 is blank, this generation is specified as the generation to be used in this case or, if all the generations are used, the generation to be used is specified as the generation whose back-up time point 255 is earliest.

When the generation number at which a back-up is to be taken is specified in step S32, the snapshot processing section 29B, by further referring to the generation information storage section 25, sets (S33) the item in the LDEV addresses 254 for each generation that is associated with this generation number 253 as the address of the auxiliary volume. At this point, if the address of the auxiliary volume is specified in the snapshot acquisition command, the specified address is diskarded and the aforesaid address is substituted.

The snapshot processing section 29B then acquires a snapshot (S44) by performing back-up to the auxiliary volume that was set in step S13 from the main volume that was designated by the snapshot acquisition command. In this way, the disk device 21 acquires a snapshot of the main volume, constituting a snapshot of the designated generation.

The snapshot processing section 29B then updates (S45) the generation management information 25 in accordance with the snapshot acquisition processing described above. Specifically, the snapshot processing section 29B updates the snapshot acquisition time point 256 corresponding to the generation number 253 of the acquired snapshot.

When the above processing has been completed, the disk control section 26 notifies the mainframe 1 of the fact that back-up has been completed (S46).

In this embodiment, a snapshot is acquired by automatically performing generation allocation when the disk array system 2 receives a snapshot acquisition command. That is, the user does not need to be conscious of the generation, since it is not necessary to specify to which generation back-up should be performed at the mainframe 1.

Figure 9:
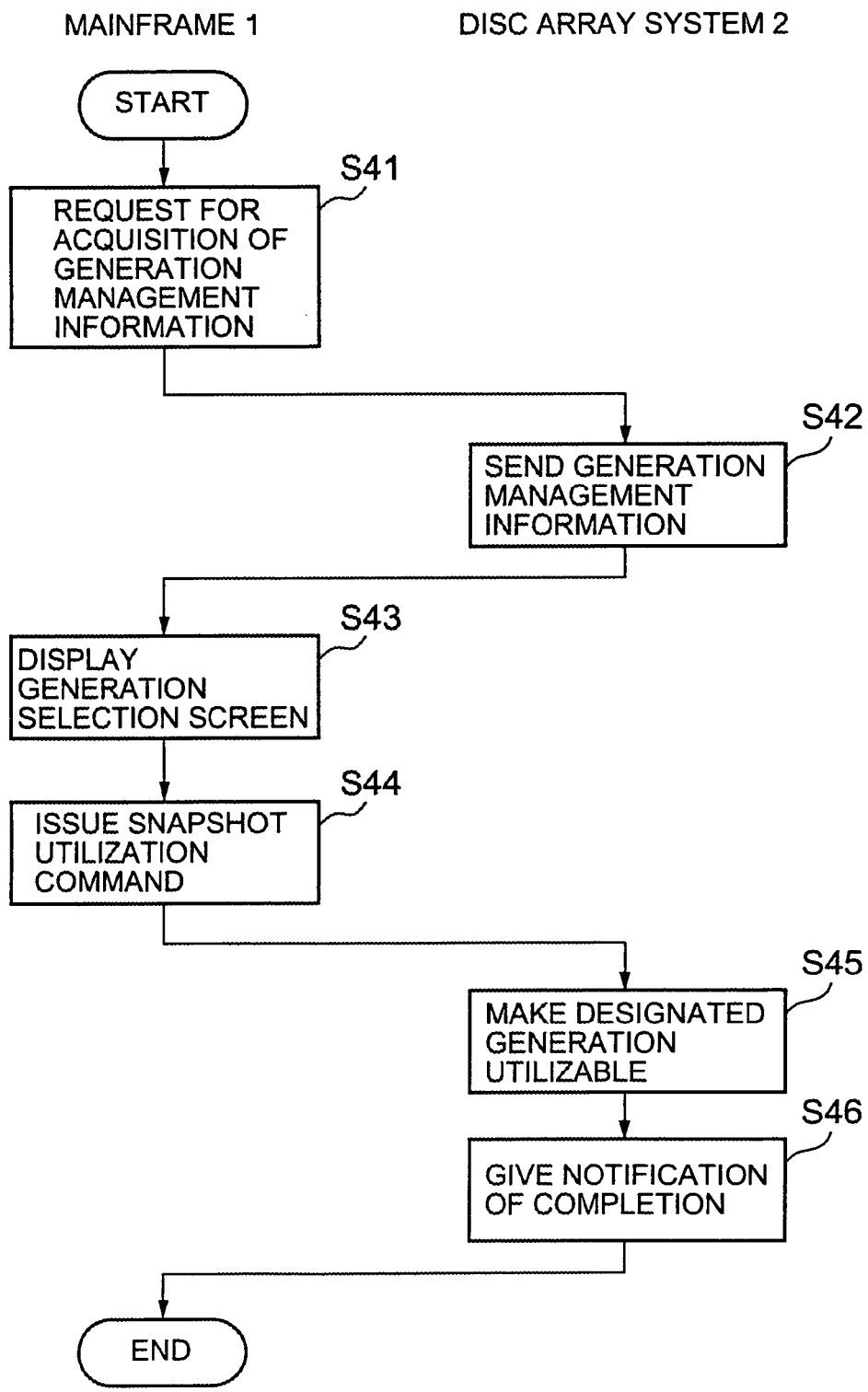
FIG. 9 is a flow chart of the processing sequence for making a snapshot utilizable.

Next, the processing for utilization of one of the snapshots acquired by the above processing will be described with reference to the flow chart of FIG. 9.

First of all, the snapshot management program 12 issues (S41) a request for acquisition of generation management information held by the disk array system 2 in respect of a main volume designated by the user using the input device 10a, or an LDEV that has been designated from an application 13. The designation of the LDEV is performed by for example designating its address.

When the control device 22 receives this generation information acquisition request, the snapshot processing section 29B acquires the generation information of the LDEV designated from the generation management information 25 and sends this to the mainframe 1 (S42).

Figure 10:
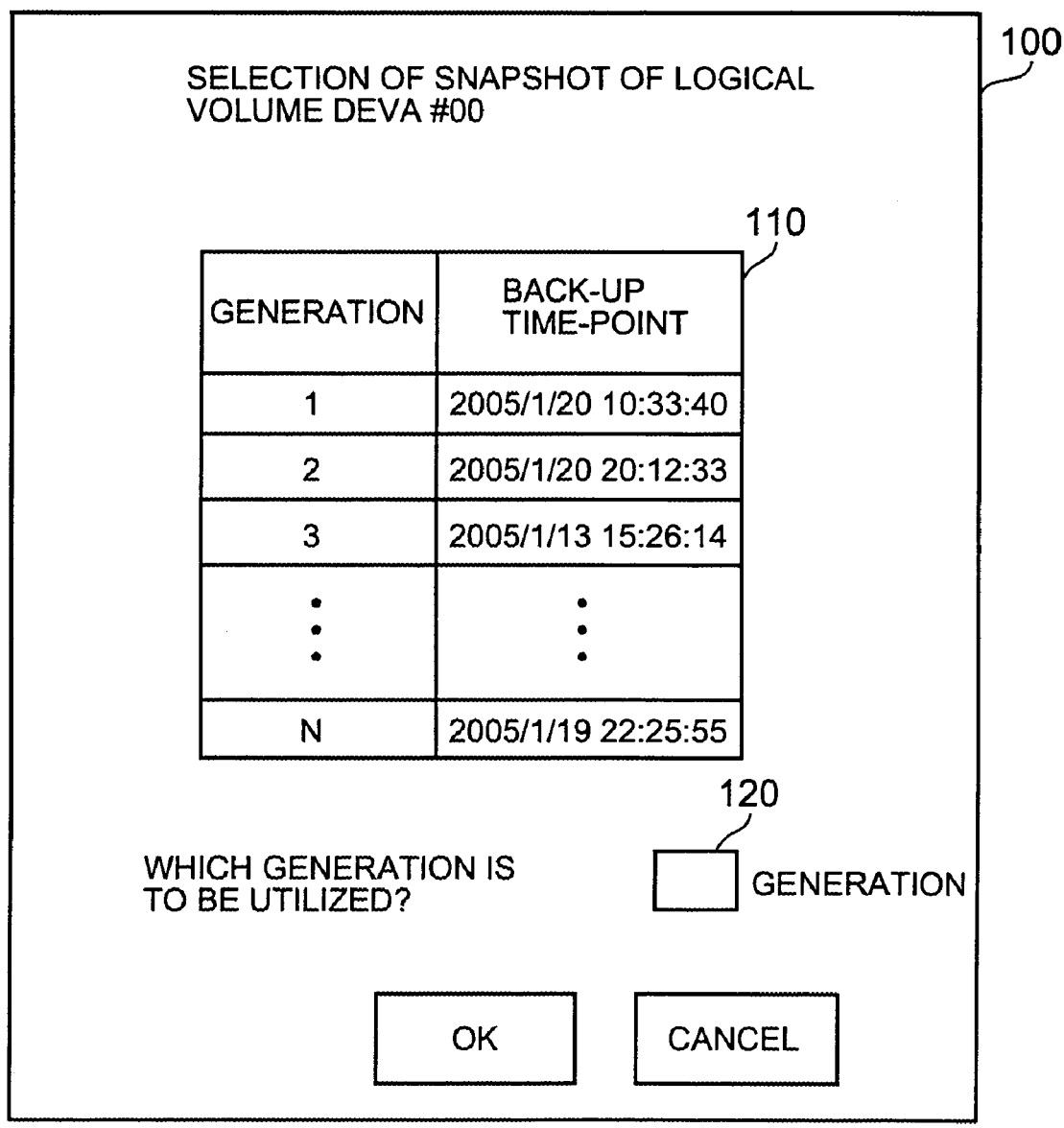
FIG. 10 is a view showing an example of a screen for selecting a snapshot generation.

The snapshot management program 12 displays (S43) on a display device 10b a screen for the user to select a generation in accordance with the generation management information sent from the disk array system 2. FIG. 10 shows an example of this selection screen 100. The generation selection screen 100 includes, as shown for example in this Figure, a table 110 of snapshot acquisition time points for each generation and a region 120 that accepts input of a generation number to be utilized. Although, in this case, only the snapshot acquisition time point is displayed for each generation number of the generation management information, it would be possible for the screen to also display generation management information other than this.

When the user selects a generation number on this generation selection screen, a snapshot utilization command to make it possible to utilize a snapshot of the designated generation number is issued (S44) in respect of the disk array system 2. In the case of the screen 100 of FIG. 8, when the user inputs the generation number of the snapshot to be utilized, this is received by the snapshot management program 12. The snapshot utilization command includes at least the generation number.

When the snapshot processing section 29B receives this snapshot utilization command, a snapshot of the generation number that is thus designated is put into a condition in which it can be utilized from the mainframe (S45), by the same processing sequence as in the case of the first embodiment. When the snapshot has thus been put into a condition in which it can be utilized from the mainframe, a message to that effect is communicated to the mainframe 1 (S46).

In this way, generation management can be automatically performed in the disk array system 2.

The embodiments of the present invention described above are examples given by way of explanation of the present invention and the scope of the present invention is not restricted solely to these embodiments. The present invention could be put into practice by persons skilled in the art in various other ways without departing from the essence of the present invention.

For example, although, in the above embodiments, a snapshot processing section was provided as a function of the interface control section, a disk control section could also be provided and either of the interface control section or disk control section could be implemented by different processors or could be implemented by a plurality of processors within the disk array system.

Also, although, in the above embodiments, the disk array system 2 holds the generation management information, this could be held by the mainframe and generation management could be performed on the mainframe.

What is claimed is:

1. A storage system that is accessed from a host device, comprising:

a storage device comprising a plurality of logical volumes;

a storage device control section that controls said storage device;

an interface section that receives a snapshot acquisition instruction and snapshot utilization instruction from said host device;

and a snapshot processing device that executes processing for acquisition and utilization of snapshots in accordance with said snapshot acquisition instruction and said snapshot utilization instruction received by said interface section;

wherein said snapshot processing device, in response to said snapshot acquisition instruction, selects a logical volume that is capable of use as a snapshot target from said plurality of logical volumes, instructs said storage device control section to acquire a snapshot of the logical volume of the snapshot source, designated in said snapshot acquisition instruction for the selected logical volume, and holds generation information that associates the generation number specified in said snapshot acquisition instruction with an address of said selected logical volume, and in response to said snapshot utilization instruction, specifies a logical volume where the snapshot corresponding to the generation number specified in said snapshot utilization instruction is held, by referring to said generation information, and allocates an address accessible by said host device to said specified logical volume.

2. The storage system according to claim 1 wherein the address accessible by said host device that is allocated to said specified logical volume is a logical volume address that is registered beforehand in said host device.

3. The storage system according to claim 1 wherein, when the address accessible by said host device is allocated to said specified logical volume, said snapshot processing device adds information indicating the fact that the address accessible by said host device has been allocated to said specified logical volume to said generation information.

4. The storage system according to claim 1 wherein the snapshot acquisition instruction further includes designation of the logical volume of the snapshot target and said snapshot processing device, in response to said snapshot acquisition instruction, if the snapshot target logical volume designated in said snapshot acquisition instruction is already used, selects an unused logical volume from said plurality of logical volumes and gives an instruction to said storage device control section to acquire a snapshot of the snapshot source logical volume designated in said snapshot acquisition instruction for the selected logical volume.

5. The storage system according to claim 1 wherein said snapshot utilization instruction further includes designation of the logical volume of the snapshot target and said snap shot processing device, in response to said snapshot utilization instruction, if a snapshot of the generation number specified in said snapshot utilization instruction has not been acquired by the snapshot target logical volume specified in said snapshot utilization instruction, allocates the logical volume address of said specified snapshot target to the logical volume where the snapshot of said designated generation number is held, by referring to said generation information, and gives notification to said host device of the fact that a snapshot of said specified generation number has become available for use.

6. A storage system that is accessed from a host device, comprising:

a storage means comprising a plurality of logical volumes;

a storage means control means that controls said storage means;

an interface means that receives a snapshot acquisition instruction and snapshot utilization instruction from said host device; and snapshot processing means that executes processing for acquiring and utilizing snapshots in accordance with said snapshot acquisition instruction and said snapshot utilization instruction received by said interface means;

wherein said snapshot processing means, in response to said snapshot acquisition instruction, if the snapshot target logical volume designated in said snapshot acquisition instruction is already used, selects an unused logical volume from said plurality of logical volumes; gives an instruction to said storage device control means to acquire a snapshot of the logical volume of the snapshot source designated in said snapshot acquisition instruction for the selected logical volume, and holds generation information associating the generation number specified in said snapshot acquisition instruction with an address of said selected logical volume; and in response to said snapshot utilization instruction, specifies a logical volume where a snapshot corresponding to the generation number specified in said snapshot utilization instruction is held, by referring to said generation information, and allocates an address accessible by said host device to said specified logical volume.

7. A method of acquiring and utilizing snapshots in a storage system that is accessed from a host device, comprising a storage device comprising a plurality of logical volumes, the method comprising the steps of:

selecting an unused logical volume from said plurality of logical volumes if the snapshot target logical volume designated in said snapshot acquisition instruction is already used, when a snapshot aquisition instruction is received from said host device;

acquiring a snapshot of the snapshot source volume designated in said snapshot acquisition instruction for the selected logical volume;

holding generation information associating the generation number specified in said snapshot acquisition instruction with an address of said selected logical volume; and specifying a logical volume where a snapshot corresponding to the generation number specified in said snapshot utilization instruction is held, by referring to said generation information, when a snapshot utilization instruction is received from said host device; and allocating an address accessible by said host device to said specified logical volume.

8. A storage system that is accessed from a host device, comprising:

a storage device comprising a plurality of logical volumes;

a storage device control section that controls said storage device;

an interface section that receives a snapshot acquisition instruction, snapshot utilization instruction and generation information acquisition instruction from said host device; and a snapshot processing device comprising a generation information storage section that stores generation information indicating the snapshot acquisition status for each generation and that executes processing in accordance with said snapshot acquisition instruction, said snapshot utilization instruction and generation information acquisition instruction received by said interface section; and wherein said snapshot processing device, in response to said snapshot acquisition instruction, selects one logical volume from said plurality of logical volumes; gives instruction to acquire a snapshot of the logical volume of the snapshot source designated in said snapshot acquisition instruction for the selected logical volume and, specifies a generation number by referring to said generation information storage section and associates this specified generation number with an address of said selected logical volume and stores these in the generation information storage section;

in response to said generation information acquisition instruction, acquires the information stored in the generation information storage section and gives an instruction to said interface section to send the information to said host device;

and, in response to said snapshot utilization instruction, specifies the logical volume where a snapshot has been acquired corresponding to the generation number specified in said snapshot utilization instruction by referring to said generation information storage section and allocates an address accessible by said host device to said specified logical volume.

9. A storage system that is accessed from a host device, comprising:

storage means comprising a plurality of logical volumes;

storage means control means that controls said storage means;

interface means that receives a snapshot acquisition instruction, snapshot utilization instruction and generation information acquisition instruction from said host device; and snapshot processing means comprising generation information storage means that stores generation information indicating the snapshot acquisition status for each generation and that executes processing in accordance with said snapshot acquisition instruction, said snapshot utilization instruction and generation information acquisition instruction received by said interface means; and wherein said snapshot processing means, in response to said snapshot acquisition instruction, selects one logical volume from said plurality of logical volumes; gives an instruction to acquire a snapshot of the logical volume of the snapshot source designated in said snapshot acquisition instruction for the selected logical volume and, specifies a generation number by referring to said generation information storage means, and associates this specified generation number with an address of said selected logical volume and stores these in said generation information storage means;

in response to said generation information acquisition instruction, acquires the information stored in said generation information storage means and gives an instruction to said interface means to send the information to said host device;

and, in response to said snapshot utilization instruction, specifies the logical volume where a snapshot has been acquired corresponding to the generation number specified in said snapshot utilization instruction by referring to said generation information storage means, and allocates an address accessible by said host device to said specified logical volume.

10. A method of acquiring and utilizing snapshots in a storage system that is accessed from a host device, comprising a storage device comprising a plurality of logical volumes and a generation information storage device that stores generation information indicating for each generation the snapshot acquisition status, the method comprising the steps of;

selecting a logical volume from said plurality of logical volumes when a snapshot acquisition instruction is received from said host device;

giving an instruction in respect of the selected logical volume for the acquisition of a snapshot of the snapshot source logical volume designated in said snapshot acquisition instruction;

specifying a generation number by referring to said generation information storage section, and associating the specified generation number with an address of said selected logical volume and storing these in said generation information storage device;

acquiring and sending to the host device the information stored in said generation information storage section when said generation information acquisition instruction is received from said host device;

specifying a logical volume where a snapshot has been acquired corresponding to the generation number specified in said snapshot utilization instruction by referring to said generation information storage section when said snapshot utilization instruction is received from said host device; and allocating an address accessible by said host device to said specified logical volume.

\* \* \* \* \*